(12) United States Patent
Möller et al.

(10) Patent No.: US 7,363,033 B2
(45) Date of Patent: Apr. 22, 2008

(54) METHOD OF AND SYSTEM FOR TESTING EQUIPMENT DURING MANUFACTURING

(75) Inventors: Bernd Möller, Henfenfeld (DE); Torbjörn Sölve, Malmö (SE); Cristian Medina-Warmburg, Nürnberg (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 528 days.

(21) Appl. No.: 10/606,684

(22) Filed: Jun. 26, 2003

(65) Prior Publication Data

US 2004/0102187 A1 May 27, 2004

Related U.S. Application Data

(63) Continuation-in-part of application No. 10/359,835, filed on Feb. 7, 2003.

(60) Provisional application No. 60/412,875, filed on Sep. 23, 2002, provisional application No. 60/412,763, filed on Sep. 23, 2002, provisional application No. 60/412,756, filed on Sep. 23, 2002, provisional application No. 60/395,771, filed on Jul. 11, 2002, provisional application No. 60/357,366, filed on Feb. 15, 2002, provisional application No. 60/357,291, filed on Feb. 15, 2002.

(51) Int. Cl.
*H04Q 7/20* (2006.01)
(52) U.S. Cl. ............... 455/425; 455/67.11; 719/328
(58) Field of Classification Search ........... 455/423, 455/67.11, 557, 115.1, 115.2, 425; 719/328
See application file for complete search history.

(56) References Cited

U.S. PATENT DOCUMENTS 3,831,148 A 8/1974 Greenwald et al.

(Continued)

FOREIGN PATENT DOCUMENTS

EP 0902596 A2 3/1999

(Continued)

OTHER PUBLICATIONS

Sture E. International Search Report, Nov. 25, 2003 (4 pages).

(Continued)

*Primary Examiner*—Edward F. Urban
*Assistant Examiner*—Christian A. Hannon
(74) *Attorney, Agent, or Firm*—Michael Cameron

(57) ABSTRACT

A platform system for a mobile terminal for a wireless telecommunications system includes a mobile-terminal platform assembly. The mobile-terminal platform assembly includes a software services component having at least one functional software unit, a hardware component having at least one hardware unit associated with and controlled by the at least one functional software unit, and an interface component having at least one interface for providing access to the mobile-terminal platform assembly. The platform system also includes test application software loaded, installed, and run on the mobile-terminal platform assembly via the interface component. The test application software tests both software and hardware of the mobile terminal during both production testing and testing performed during a lifecycle of the mobile terminal. The test application software may be located in an unprotected code space of the mobile terminal in order to allow the test application software to be overwritten as needed to make space for other applications.

15 Claims, 6 Drawing Sheets

U.S. PATENT DOCUMENTS

| | | | | |
|---|---|---|---|---|
| 5,444,869 | A | * | 8/1995 | Stricklin et al. ............ 455/90.2 |
| 5,689,565 | A | | 11/1997 | Spies et al. |
| 5,771,240 | A | | 6/1998 | Tobin et al. |
| 5,937,366 | A | | 8/1999 | Zhytniewski et al. |
| 6,002,869 | A | | 12/1999 | Hinckley |
| 6,044,408 | A | | 3/2000 | Engstrom et al. |
| 6,049,896 | A | | 4/2000 | Frank et al. |
| 6,052,524 | A | | 4/2000 | Pauna |
| 6,061,709 | A | | 5/2000 | Bronte |
| 6,105,154 | A | | 8/2000 | Wang et al. |
| 6,112,312 | A | | 8/2000 | Parker et al. |
| 6,137,802 | A | | 10/2000 | Jones et al. |
| 6,269,396 | B1 | | 7/2001 | Shah et al. |
| 6,279,124 | B1 | | 8/2001 | Brouwer et al. |
| 6,317,659 | B1 | | 11/2001 | Lindsley et al. |
| 6,353,897 | B1 | | 3/2002 | Nock et al. |
| 6,389,491 | B1 | | 5/2002 | Jacobson et al. |
| 6,434,364 | B1 | * | 8/2002 | O'Riordain .............. 455/67.11 |
| 6,587,671 | B1 | * | 7/2003 | Kanago et al. .......... 324/158.1 |
| 6,918,108 | B2 | * | 7/2005 | Rajaram ..................... 717/126 |
| 7,020,598 | B1 | * | 3/2006 | Jacobson ..................... 703/14 |
| 2001/0015654 | A1 | | 8/2001 | Habersetzer et al. |
| 2002/0029378 | A1 | | 3/2002 | Larsson |
| 2002/0032022 | A1 | * | 3/2002 | Ozaki ......................... 455/418 |
| 2002/0069065 | A1 | | 6/2002 | Schmid et al. |
| 2003/0004697 | A1 | * | 1/2003 | Ferris ........................... 703/13 |
| 2003/0051075 | A1 | * | 3/2003 | Purpura ......................... 710/1 |
| 2003/0054858 | A1 | * | 3/2003 | Yambe ........................ 455/557 |
| 2003/0115018 | A1 | * | 6/2003 | Sharma et al. ............. 702/183 |
| 2003/0125020 | A1 | * | 7/2003 | Sauriol et al. ............. 455/425 |
| 2003/0135785 | A1 | * | 7/2003 | Carr ............................. 714/25 |
| 2003/0221024 | A1 | * | 11/2003 | Arroyo et al. ............. 709/331 |
| 2003/0224823 | A1 | * | 12/2003 | Hurst et al. ................. 455/558 |
| 2004/0015809 | A1 | * | 1/2004 | Cheng ........................ 717/100 |

FOREIGN PATENT DOCUMENTS

| | | |
|---|---|---|
| EP | 1074911 | 2/2001 |
| EP | 1 136 912 | 9/2001 |
| EP | 1 136 912 A2 | 9/2001 |
| EP | 1241905 A1 | 9/2002 |
| WO | WO 97/16938 | 5/1997 |
| WO | WO 98/19239 | 5/1998 |
| WO | WO 99/49394 | 9/1999 |
| WO | WO 00/08611 | 2/2000 |
| WO | WO 00/69084 | 11/2000 |
| WO | WO 00/72586 A2 | 11/2000 |
| WO | WO 01/14960 | 3/2001 |
| WO | WO 01/41393 A2 | 6/2001 |
| WO | WO 01/50282 A1 | 7/2001 |
| WO | WO 01/51940 | 7/2001 |
| WO | WO 01/51940 A1 | 7/2001 |
| WO | WO 01/88707 | 11/2001 |
| WO | WO 02/27565 | 4/2002 |
| WO | WO 02/27565 A1 | 4/2002 |
| WO | WO 02/29824 | 4/2002 |
| WO | WO 02/29824 A2 | 4/2002 |
| WO | WO 02/33879 | 4/2002 |
| WO | WO 02/35351 | 5/2002 |
| WO | WO 02/054094 | 7/2002 |
| WO | WO 02/054094 A1 | 7/2002 |

OTHER PUBLICATIONS

Mapping Reqirements to Architecture: an Experience Report from the VIVIAN Project; Titos Saridakis; Nokia Research Center; In Proc. 14th International Conference on Software and Systems Engineering and their Applications; Dec. 2001; pp. 1-6.

Functionality Needed in Middleware for Future Mobile Computing Platforms by Kimmo Raatikainen; Nokia Research Center, Software Technology Laboratory; Middleware for Mobile Computing Workshop at IFIP/ACM Middleware Conference; Heidelberg Germany, 2001; 10 pages.

U.S. Appl. No. 10/359,911.

U.S. Appl. No. 10/665,834.

U.S. Appl. No. 10/666,673.

U.S. Appl. No. 10/666,699.

U.S. Appl. No. 10/359,772.

U.S. Appl. No. 10/664,618.

Manuel Rodriguez-Martinez et al., "Automatic Deployment of Application-Specific Metadata and Code in MOCHA", Lecture Notes in Computer Science, Mar. 31, 2000 (pp. 69-85).

N.J. Drew et al., "Reconfigurable Mobile Communications: Compelling Needs and Technologies to Support Reconfigurable Terminals", IEEE International Symposium on Personal, Indoor and Mobile Radio Communications, PIMRC. Wireless: Merging onto the Information Superhighway, vol. 1, Sep. 18, 2000 (pp. 484-489).

Aspects & Crosscutting in Layered Middleware Systems by Lodewiik M.J. Bergmans et al.; Trese Group-Center for Telematics and Information Technology (CTIT); pp. 1-3.

Supporting the Design of Adaptable Operating Systems Using Aspect-Oriented Frameworks by Paniti Netinant et al.; International Conference on Parallel and Distributed Processing Techniques and Applications (PDPTA 2000); Las Vegas, Nevada; Jun. 26-29, 2000; 7 Pages.

A Layered Approach to Building Open Aspect-Oriented Systems by Paniti netinant et al.; Communications of the AC; Oct. 2001; vol. 44, No. 10; pp. 83-85.

Aspect-Oriented Programming by Silvia Breu; pp. 1-22.

Draft: Aspect-Design in the Building-Block Method by Jurgen K. Muller; Philips Research Laboratories; International Workshop on Aspect-Oriented Programming at ECOOP, 1992; 3 Pages.

A Version Model for Aspect Dependency Management by Elke Pulvermuller et al.; J. Bosh (Ed.): GCSE 2001, LNCS 2186, Springer-Verlag Berlin Heidelberg 2001, pp. 70-79.

Can AOP Support Extensibility in Client-Serer Architectures? by Yvonne Coady et al.; European Conference on Object-Oriented Programming (ECOOP); Aspect-Oriented Workshop, Jun. 2001; pp. 1-4.

Mapping Requirements to Architecture: an Experience Report from the VIVIAN Project by Titos Saridakis; Proceedings of the 14th International Conference on Software and Systems Engineering and their Applications, Dec. 2001; pp. 1-6.

Functionality Needed in Middleware for Future Mobile Computing Platforms by Kimmo Raatikainen; Middleware for Mobile Computing Workshop held at IFIP/ACM Middleware Conference, Heidelberg, Germany, 2001; 10 Pages.

Design and Implementation of Java Application Environment and Software Platform for Mobile Phones, by Kazutoshi Usui, Hiroyuki Tomimori, Junji Takagi, Tomohisa Tanaka and Yukikazu Nakamoto; XP-001092568; Special Issue on IMT2000 Mobile Communication System; Oct. 2001; pp. 379-383.

Container-Managed Messaging: An Architecture for Integrating Java Components and Message-Oriented Applications by Ignacio Silva-Lepe, Christopher Codella, Peter Niblett, Donald Ferguson, Proceedings of the 37th International Conference on Technology of Object-Oriented Languages and Systems (Tools-Pacific 2000), Sydney, NSW, Australia, Nov. 20-23, 2000; pp. 228-241.

K. Moessner, et al., "Terminal Reconfigureability—The Optima Framework" 3G Mobile Communication Technologies, No. 477, XP002266662, Mar. 26-28, 2001, (pp. 241-246).

U.S. Appl. No. 10/359,835, Torbjörn Sölve et al.

Don Batory et al., "The Design and Implementation of Hierarchical Software Systems with Reusable Components" ACM Transactions on Software Engineering and Methodology, Association for Computing Machinery, New York, US, vol. 1, No. 4, Oct. 1, 1992, pp. 355-398.

Gabriele Goldacker et al., "Broadband-ISDN standardization—State of the art", Computer Standards and Interfaces, Elsevier Sequoia. Lausanne, CH, vol. 17, No. 1, 1995, pp. 55-62.

K. Moessner, et al., "Terminal Reconfigureability—The Software Download Aspect", 3G Mobile Communication Technologies, Conference Publication, No. 471, XP002266663, (pp. 326-330).

* cited by examiner

METHOD OF AND SYSTEM FOR TESTING EQUIPMENT DURING MANUFACTURING

CROSS-REFERENCE TO RELATED APPLICATIONS

This patent application is a continuation-in-part of co-pending U.S. patent application Ser. No. 10/359,835, which was filed on Feb. 7, 2003. U.S. patent application Ser. No. 10/359,835 claims the benefit of priority from U.S. Provisional Patent Application No. 60/357,366, filed on Feb. 15, 2002, U.S. Provisional Patent Application No. 60/357,291, filed on Feb. 15, 2002, U.S. Provisional Patent Application No. 60/412,756, filed on Sep. 23, 2002, U.S. Provisional Patent Application No. 60/412,763, filed on Sep. 23, 2002, and U.S. Provisional Patent Application No. 60/412,875, filed on Sep. 23, 2002. This patent application incorporates by reference the entire disclosures of each of U.S. patent application Ser. No. 10/359,835, U.S. Provisional Patent Application No. 60/357,366, U.S. Provisional Patent Application No. 60/357,291, U.S. Provisional Patent Application No. 60/412,756, U.S. Provisional Patent Application No. 60/412,763, and U.S. Provisional Patent Application No. 60/412,875. This patent application claims the benefit of priority from and incorporates by reference the entire disclosure of U.S. Provisional Patent Application No. 60/395,771, filed on Jul. 11, 2002.

BACKGROUND OF THE INVENTION

1. Technical Field of the Invention

The present invention relates generally to the field of testing of equipment and, more particularly, to a method of and system for testing of electronic equipment, such as mobile terminals used within a cellular telecommunications system, during a manufacturing process.

2. Description of Related Art

Since cellular telecommunications systems were first introduced in the 1980s, mobile terminals utilized in the systems have become increasingly complex. The mobile terminals were initially designed to provide primarily voice telephony services. In later years, mobile terminals were developed that also included the ability to transfer user data not related to voice telephony. Such user data included, for example, data to be transferred over a dial-up networking connection initiated via a personal computer (PC).

Third generation (3G) cellular telecommunications systems are currently being developed. These 3G systems combine high-speed internet access with traditional voice communication capabilities and will provide users with access to internet browsing, streaming audio/video, positioning, video conferencing, and many other capabilities.

The Third Generation Partnership Project (3GPP) was established to ensure compatibility among several 3G systems that are being developed around the world. The Universal Mobile Telephone System (UMTS) is being developed by 3GPP to provide a 3G system that includes terrestrial and satellite systems capable of delivering voice, data, and multimedia anywhere in the world.

The drastically increased functionality that is being included in cellular telecommunications systems via the 3GPP standardization has placed substantial demands on the developers of mobile terminals to be used in the systems. These demands are further increased by the fact that a mobile terminal is a resource-scarce environment that is relatively limited in size, memory, and power.

Software and hardware of the mobile terminals must be tested during manufacturing in order to ensure proper operation of the mobile terminals for the end user under expected operational conditions. Many current test programs are standalone applications that are loaded into the mobile terminal to be tested and then executed independently from other software used by the mobile terminal during normal operation of the mobile terminal. After execution of tests via the test program, the test program is typically deleted and the software used by the mobile terminal during normal operation is loaded into the mobile terminal. Thus, software must be loaded into the mobile terminal twice during production. In addition, because the test programs typically do not use the software used by the mobile terminal during normal operation, unnecessary duplication of software often results. In addition, the software used during normal operation is not tested.

There is, accordingly, a need for a method of and system for testing equipment, such as mobile terminals, during manufacturing that solves these and other drawbacks associated with the prior art.

SUMMARY OF THE INVENTION

These and other drawbacks are overcome by embodiments of the present invention, which provides a method of and system for testing equipment during a manufacturing process. A platform assembly of a mobile terminal includes a software services component that includes at least one functional software unit, a hardware component that includes at least one hardware unit associated with the at least one functional software unit, and an interface component that includes at least one software interface. The interface component is adapted to provide access by mobile-terminal application software to the software services component and the hardware component during testing of the mobile terminal and during a lifecycle of the mobile terminal.

A method of testing a mobile terminal includes interoperably connecting the mobile terminal to a test system. The mobile terminal includes an interface component. The interface component includes at least one software interface. The method also includes providing, via the interface component, of access by mobile-terminal-test application software to software and hardware of the mobile terminal during testing of the mobile terminal, the test system controlling the mobile-terminal-test application software via an external interface during the testing of the mobile terminal, and retaining the interface component, the hardware, and the software on the mobile terminal. Further advantages and specific details of the present invention will become apparent hereinafter from the detailed description given below in conjunction with the following drawings.

DETAILED DESCRIPTION OF THE EXEMPLARY EMBODIMENTS OF THE INVENTION

Figure 1:
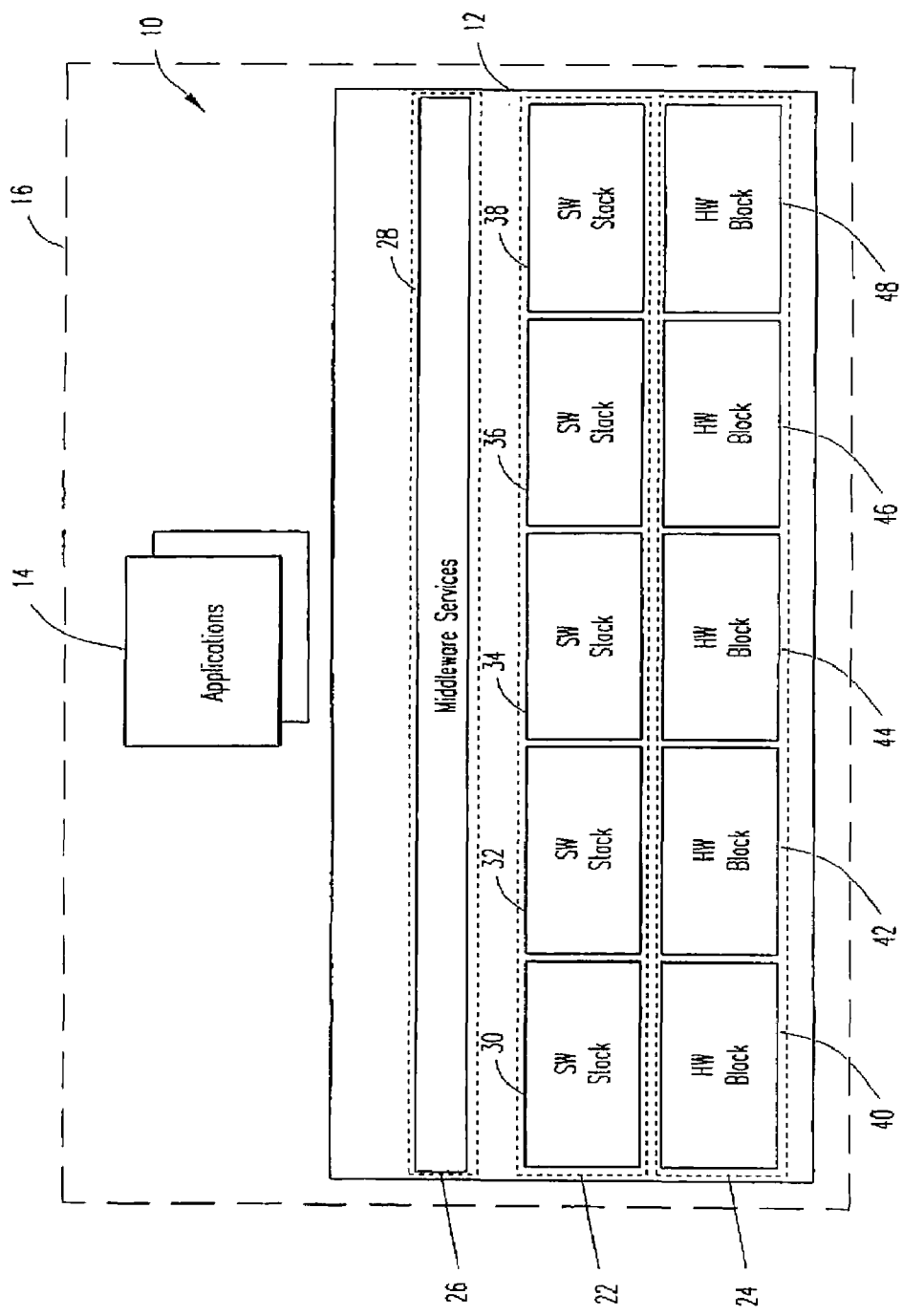
FIG. 1 is a block diagram that schematically illustrates a platform system for a mobile terminal for a wireless telecommunications system in accordance with principles of the present invention.

FIG. 1 is a block diagram that schematically illustrates a platform system 10 for a mobile terminal for a wireless telecommunications system in accordance with principles of the present invention. The platform system 10 includes a mobile-terminal platform assembly 12 and application software (i.e., one or more applications) 14 that have been loaded, installed, and run in the mobile-terminal platform assembly. The platform system 10 is adapted to be incorporated in a mobile terminal 16, the mobile terminal 16 being generally designated by a dotted line. The mobile-terminal platform assembly 12 includes a software services component 22, a hardware component 24, and an interface component 26.

The software services component 22 includes at least one well-structured functional software unit for providing services that are offered to users via the interface component 26. In the exemplary embodiment illustrated in FIG. 1, the at least one software unit includes five vertically-oriented functional software units: a software stack 30; a software stack 32; a software stack 34; a software stack 36; and a software stack 38.

The hardware component 24 includes a set of hardware units that are associated with and controlled by their respective functional software stacks. In the exemplary embodiment illustrated in FIG. 1, the hardware units include a hardware block 40, a hardware block 42, a hardware block 46, and a hardware block 48.

The interface component 26 preferably includes a middleware services layer 28. The middleware services layer 28 includes one or more application programming interface (API) options for development of specific user applications. These APIs may include standardized (non-native) interfaces, de facto standard interfaces, and/or open native interfaces. For example, a standardized interface might include the JAVA 2 Micro Edition (J2ME) environment according to Mobile Information Device Profile/Connected Limited Device Configuration (MIDP/CLDC). As will be described hereinafter, the middleware services layer 28 also functions to isolate the assembly from user applications via the one or more interfaces.

The mobile-terminal platform assembly 12 of the platform system 10 is adapted to be designed, implemented, assembled, and tested as an enclosed unit separate from the application software 14 (the term "application software" as used herein may be any software that provides functionality that users may wish to have available). Users may, accordingly, develop or otherwise acquire their own application software and add that software to the mobile-terminal platform assembly 12 at a later time in order to tailor the platform system 10. In accordance with principles of the present invention, the mobile-terminal platform assembly 12 may be sold or otherwise transferred to a plurality of different users. A user may be a network operator, a service technician, an operator, or any other legitimate user of a test application. Each of the users may tailor the platform system 10 by loading, installing, and running their own application software in the assembly 12 in order to satisfy their own particular requirements for the platform system 10.

The software stacks 30-38 of the software services component 22 and the associated hardware units 40-48 define functional stacks that are structured into manageable pieces (software modules and hardware blocks) having clearly defined functionality and interfaces. A user of the mobile-terminal platform assembly 12 does not have to be concerned about the internal details of the functional stacks, but can access the stacks via the middleware services layer 28 to obtain the functionality required to design/include desired application software.

Figure 2:
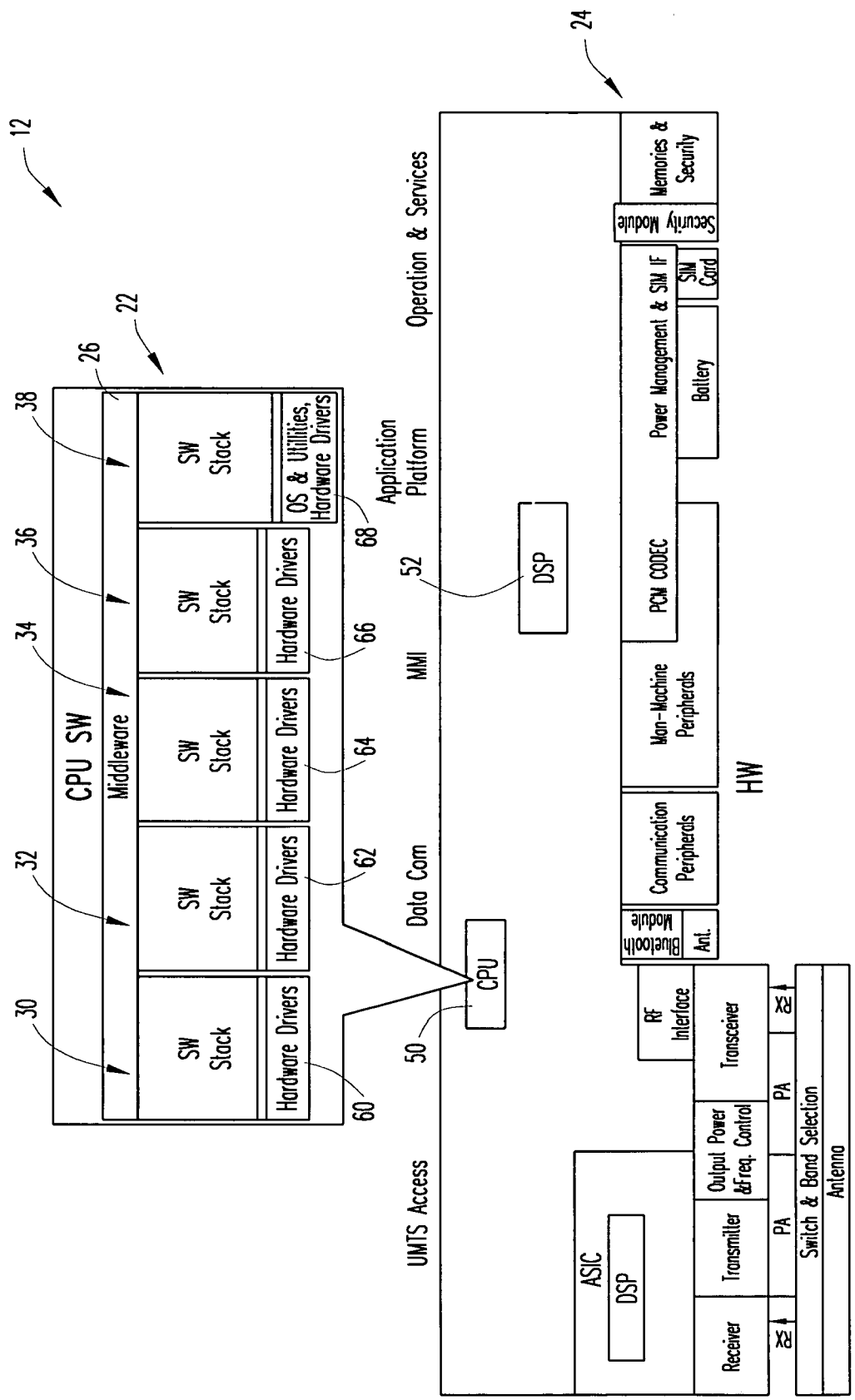
FIG. 2 is a block diagram that schematically illustrates a deployment view of a mobile-terminal platform assembly of the platform system of FIG. 1 in accordance with principles of the present invention.

FIG. 2 is a block diagram that schematically illustrates a deployment view of the mobile-terminal platform assembly 12 of FIG. 1 in accordance with principles of the present invention. It should be clearly understood, however, that the mobile-terminal platform assembly 12 could include any desired number of functional units arranged in numerous different ways and providing any desired functions and is not intended to limit the present invention to the illustrated embodiment.

As illustrated in FIG. 2, the mobile-terminal platform assembly 12 is controlled via software executing in one or more processors, such as, for example, microprocessors, micro programmable processors, or Digital Signal Processors (DSPs). The software stacks 30-38 of the software component 22 each include hardware driver software 60-68 to operate hardware units associated with each stack. As shown in FIG. 2, exemplary of the hardware units that are controlled by the functional software stacks include a mobile communication receiver and transmitter, a power and frequency controller, a BLUETOOTH module, various communication and man-machine peripherals, power management and Subscriber Identity Module (SIM) interface, memories and security hardware. The software incorporated in mobile-terminal platform assembly 12 is preferably arranged in such a manner as to make the software organization easy to understand, modify, or further develop upon. Such a capability is especially important when developing or revising complex software systems.

Figure 3:
FIG. 3 is a block diagram that schematically illustrates software architecture of the mobile-terminal platform assembly of FIGS. 1 and 2 in accordance with principles of the present invention.

FIG. 3 is a block diagram that schematically illustrates the software architecture of the mobile-terminal platform assembly 12 in accordance with principles of the present invention. As shown in FIG. 3, the software services component 22, in addition to being organized into at least one vertical, functional software stack as described above, is also arranged to define at least one horizontal layer such that the software of the middleware services layer 28 and the software of the software services component 22 together define a layered architecture 70, in which layers are arranged in descending order from a higher-level service layer to a lower-level service layer.

The software architecture according to exemplary embodiments of the present invention differs from the standard ISO Open Systems Interconnection (ISO/OSI) model in that it includes at least one horizontally-partitioned functional software unit that complements at least one vertically-partitioned software layer. The horizontal partitioning contributes significantly to the creation of independent modular (service) components.

The highest layer of the layered architecture is the middleware services layer 28, which, as indicated above, provides one or more interfaces to the mobile-terminal platform assembly 12 and also isolates the mobile-terminal platform assembly 12 from the applications using the mobile-terminal platform assembly 12. The middleware services layer 28 also provides other environmental services for the applications.

The layers of the software services component 22 include a logical-drivers layer 90 and a physical-drivers layer 92 encapsulating hardware dependencies. The logical-drivers layer 90 and the physical-drivers layer 92 interact with one another and permit hardware to be tested simply. In addition, the software services component 22 includes basic system services layers 94 that provide general services that are needed by the mobile-terminal platform assembly 12.

The logical-drivers layer 90 and the physical-drivers layer 92 constitute Hardware Abstraction Layers (HAL) that isolate the dependencies between the software and the hardware. Only the physical-drivers layer 92 is concerned with the details of the hardware (i.e., in which registers in the ASIC hardware are addressed). The logical-drivers layer 90 provides a logical mapping to the hardware; in other words, the logical-drivers layer 90 provides a bridge between the hardware and software parts of the mobile-terminal platform assembly 12.

The software itself is organized into at least one software module (e.g., modules 102, 104, 106). In the software services component 22, a single module may reside in only one vertical functional stack and in only one horizontal layer within that stack. Each layer may contain from one to many modules. All of the modules in a particular layer and in a particular stack have the same level of abstraction. Communication among the various modules is accomplished via a Software Back Plane (SwBP) 112.

There is no hard coupling between the various modules and the interfaces in the SwBP 112. As a result, the modules and/or the implementation of the interfaces may be freely changed, rearranged, or further developed upon without any impact on the clients (e.g., the applications) to the interfaces. This is an important capability as it permits individual modules to be added, removed or changed without affecting other modules in the mobile-terminal platform assembly 12.

Further specific features and details of the layered architecture, including the software structure of the SwBP 112 that enables the internal communication between modules within the mobile-terminal platform assembly are described in commonly-assigned U.S. patent application Ser. No. 10/359,911, the entire disclosure of which is incorporated by reference.

The middleware services layer 28 provides and supports a range of different application environments for development and execution of applications. Each application environment has its own characteristics and is defined as:

The way applications are developed (programming language support, compilation and linkage).

The way applications are executed (e.g., interpretation or native code execution)

The functional services that are offered.

Potential restrictions in use.

By providing multiple application environment alternatives, a wide range of products with varying demands such as cost, ease of use, time to market, functionality set, size, portability, etc. is facilitated. As shown in FIG. 3, such environments offered by the middleware layer may include a JAVA execution (EXE) environment domain or other standard or proprietary interface domains.

As indicated above, the middleware services layer 28 also functions to encapsulate the mobile-terminal platform assembly 12 and to isolate the mobile-terminal platform assembly 12 from the application software 14 via the interfaces provided by the middleware services layer 28. Further features and details of the middleware services layer 28 are described in commonly-assigned U.S. patent application Ser. No. 10/359,772, the disclosure of which is incorporated herein by reference.

An important aspect of the platform system of the present invention is that it is scalable in the sense that it enables the configuration of services required for the development of cost and size-restricted devices. The services provided by mobile-terminal platform assembly 12 are independent of platform-assembly internal structure and of data types. Accordingly, applications are unaffected by any platform-assembly internal changes, as long as the functionality and the interfaces remain unchanged. The platform assembly can thus be updated, improved upon, or otherwise modified without affecting existing applications in any way.

UMTS, for example, permits mobile terminals to utilize many applications in addition to traditional voice communications. Some of these applications, such as, for example, electronic payment, gambling, ticketing and/or corporate access services, will require effective security mechanisms. Security mechanisms in current mobile terminal applications closely follow the approach used in the PC market in that the security software is vertically integrated with the application. Vertical software integration is not suitable for mobile terminals or other devices that are resource-scarce, particularly when the mobile terminal must support a plurality of different applications requiring security mechanisms, as vertical software integration would result in a duplication of security functionality in the various applications and a waste of terminal resources.

According to a further exemplary embodiment of the present invention, the mobile-terminal platform assembly 12 of the platform system 10 further includes a security mechanism for protecting applications that require such a capability and, at the same time, shares commonly-used functionality among the various applications as much as possible so as to reduce requirements with respect to computing power, battery life, and memory.

The security mechanism according to an exemplary embodiment of the present invention combines the layered, modular-design principles of mobile-terminal platform assembly 12 with the capabilities of a generic crypto API such as PKCS#11. The achieved architecture allows easy integration of removable and non-removable (fixed-mounted) smart cards or multi-media cards (e.g., MMC or SD cards) with integrated security mechanisms.

Figure 4:
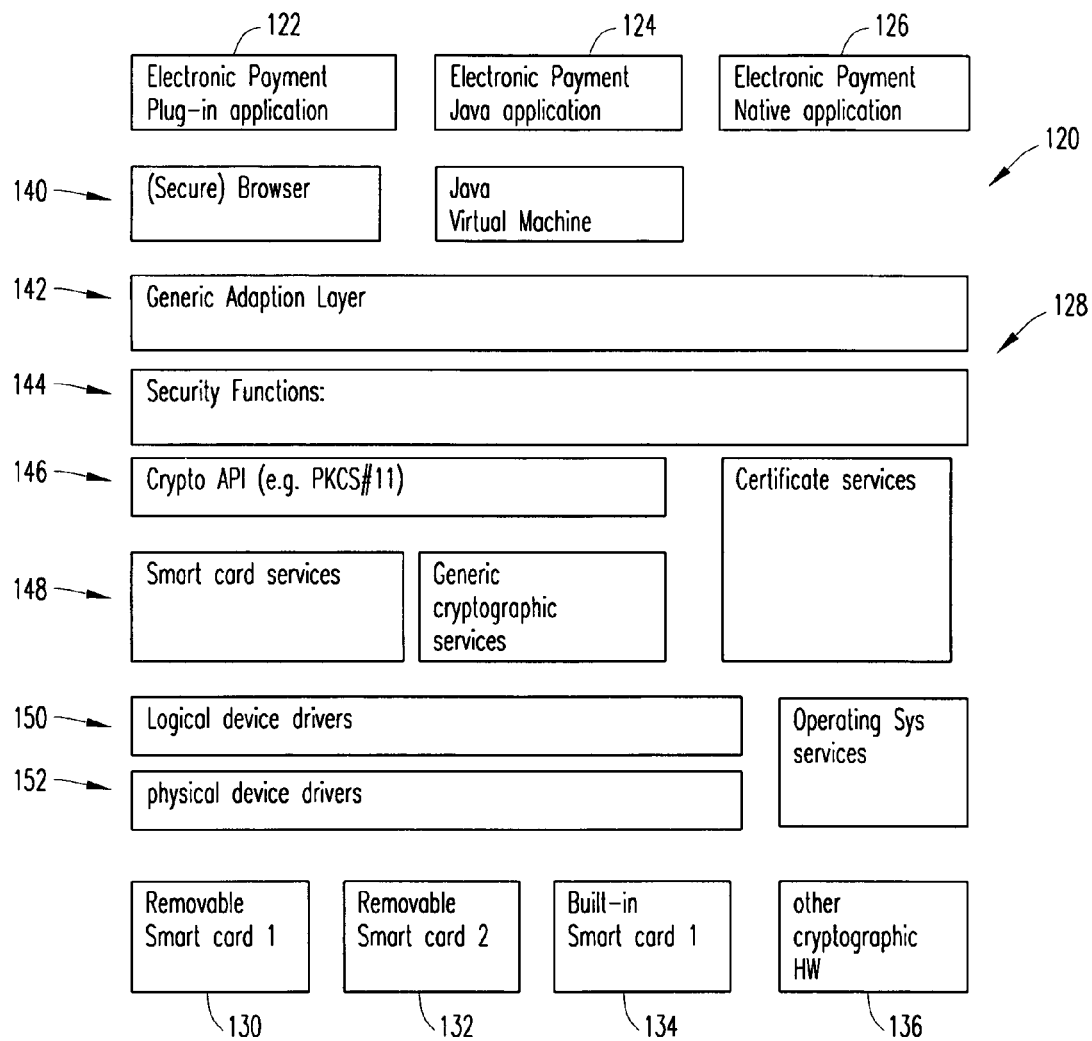
FIG. 4 is a block diagram that schematically illustrates a security mechanism that may be incorporated in the mobile-terminal platform assembly of FIGS. 1 and 2 in accordance with principles of the present invention.

FIG. 4 is a block diagram that schematically illustrates a security mechanism 120 that may be incorporated into the mobile-terminal platform assembly of a platform system in accordance with principles of the present invention. In the embodiment illustrated in FIG. 4, the platform system includes three customer payment applications 122, 124, 126; one using a browser and its environment, one implemented as a JAVA application, and one as a native (to the device operation environment) application. FIG. 4 also illustrates a functional stack 128 that includes both functional software components and hardware components. In particular, the hardware includes removable and fixed hardware for cryptographical services in the form of removable smart cards 130 and 132, a built-in smart card 134 and special built-in cryptographic hardware 136.

As also shown in FIG. 4, the security mechanism 120 is implemented using the layered, modular functional approach described with reference to FIG. 3, wherein the software is arranged in layers 140-152, with each layer including at least one software module. A layered, modular functional software architecture decreases development costs, not only during initial design and testing but also during implementation of the design, since the functionality is only implemented once. Furthermore, software memory costs are reduced and device differentiation cost by, for example, the addition of cryptographic hardware accelerators can be realized without affecting the application software.

Figure 5:
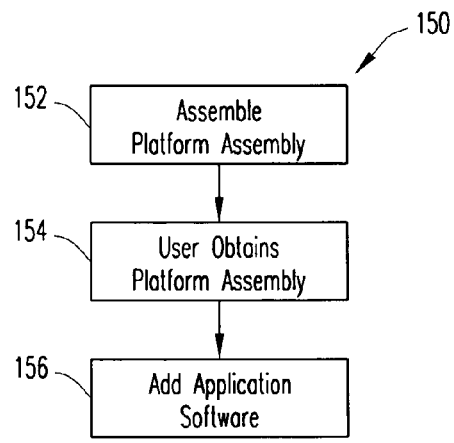
FIG. 5 is a flow chart that schematically illustrates steps of a method for providing a platform system for a mobile terminal for a wireless telecommunications system in accordance with principles of the present invention.

FIG. 5 is a flow chart that schematically illustrates steps of a method flow 150 for providing a platform system for a mobile terminal for a wireless telecommunications system in accordance with principles of the present invention. The flow 150 begins by assembling a mobile-terminal platform assembly that includes a software services component, a hardware component, and an interface component (step 152). After the platform assembly has been fully assembled, application software is then added to the assembly to tailor the platform system (step 156). The application software can be added by a customer or other user after the platform assembly is sold or otherwise transferred to the user (step 154).

Figure 6:
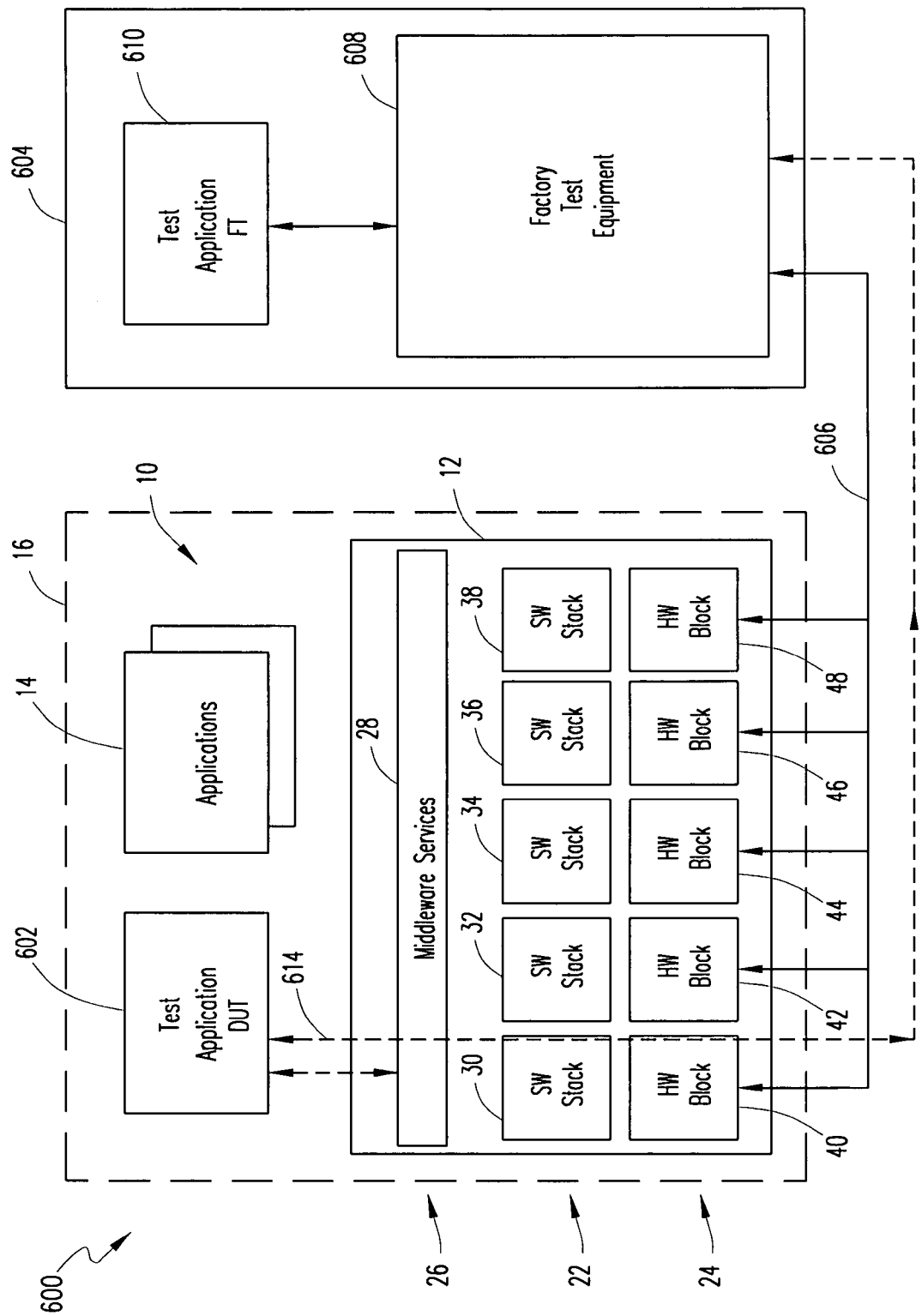
FIG. 6 is a block diagram that schematically illustrates the platform system of FIG. 1 in operation with a factory test system in accordance with principles of the present invention.

FIG. 6 is a block diagram that schematically illustrates the platform system of FIG. 1 in operation with a factory test system in accordance with principles of the present invention. The platform system 10 shown in FIG. 6 is largely the same as the platform system 10 shown in FIG. 1, except that, in addition to the applications 14, a test application of the device under test (test application DUT) 602 is also shown loaded onto the mobile terminal 16.

The test application DUT 602 is preferably a downloadable software application that is delivered together with the applications 14, resides on top of the middleware services layer 28, and is executed on the mobile-terminal platform assembly 12. The test application DUT 602 is typically checked for a valid digital certificate before being installed. In embodiments of the present invention, only pre-defined trusted entities are permitted to sign the test application DUT 602 with a digital certificate. During execution, the test application DUT 602 tests different parts of the software 30, 32, 34, 36, and 38 and primarily the hardware blocks 40, 42, 44, 46, and 48. The test application DUT 602 is controlled by a factory test system 604 via commands received via an external peripheral interface. The device under test is illustrated herein as a mobile terminal. For purposes of this patent application, the term mobile terminal includes any type of electronic equipment, such as, for example, handheld computers, personal digital assistants, pagers, and the like.

The mobile terminal 16 is interoperably connected to the factory test system 604 via a data connection 614. The data connection 614 permits factory test equipment 608 of the factory test system 604 to interface with one of the external data communication interfaces that provide a logical communication channel between the factory test equipment 608 and the test application DUT 602. The factory test system 608 also includes a test application of the factory tester (test application FT) 610. The test application FT 610 is shown in communication with the factory test equipment 608. In similar fashion, the test application DUT 602 is shown in communication with the middleware services layer 28 of the mobile-terminal platform assembly 12. Communications of the test application FT 610 with the factory test equipment 608 and communication of the test application DUT 602 with the middleware services layer 28 are illustrated by respective solid arrows.

The test application DUT 602 can access the software stacks 30, 32, 34, 36, and 38, as well as the hardware blocks 40, 42, 44, 46, and 48 via the middleware services layer 28. The hardware blocks 40, 42, 44, 46, and 48 interfaces with the factory test equipment 608 via the measurement interface 606. An exemplary logical interface 614 between the test application DUT 602 and the factory test equipment 608 is illustrated by a dashed arrow. The logical interface 614 may be effected via, for example, a standard communication interface such as, for example, Universal Serial Bus (USB) or RS232.

In accordance with principles of the present invention, the middleware services layer 28 provides for communication with all needed software and hardware elements of the mobile terminal 16 so that specific test software is not necessary during production, development, or service tests to perform the functions of, for example, the hardware blocks 40, 42, 44, 46, and 48. Rather, in embodiments of the present invention, a manufacturer or operator of the mobile terminal 16 writes the test application DUT 602 such that the test application DUT 602 interfaces directly with only the middleware services layer 28.

The test application DUT 602 uses the broader access capabilities of the mobile-terminal platform assembly 12 in order to test both hardware and software of the mobile terminal 16. Although testing of the mobile terminal 16 with the factory test system 604 is illustrated in the context of production test in the factory, principles of the present invention are applicable to service and maintenance of the mobile terminal 16 during a lifecycle of the mobile terminal 16 and also to laboratory tests run during product development of the mobile terminal 16. In embodiments of the present invention, the test application DUT 602 may be made to reside in an unprotected area of the platform system 10 so that the unprotected area may be overwritten after production of the mobile terminal 16 with, for example, other downloaded applications.

In accordance with principles of the present invention, the test application DUT 602 can test both hardware and software of the mobile terminal 16 during the same test process. The need for specific drivers and other software to be written for testing separately from drivers and other software to be used during the lifecycle of the mobile terminal 16 is thus avoided. In addition, the test application DUT 602 may, as noted above, be overwritten upon completion of production testing in the factory or may be left on the mobile terminal 16 so that the test application DUT 602 can be used during maintenance or service of the mobile terminal 16 during the life cycle of the mobile terminal 16.

In embodiments of the present invention, the code space for the mobile-terminal platform assembly 12 is locked to end users as well as to other unauthorized entities that access the phone following production, such as, for example, cellular system operators or other customers of the manufacturer. The test application DUT 602 is stored in other code spaces of the mobile terminal 16, so that the test application DUT 602 can be accessed. The test application DUT 602 is preferably made inaccessible to end users but accessible to operators. The test application FT 610 controls the testing of the mobile terminal 16 via the factory test equipment 608, the logical interface 614 provided by one of the external interfaces of the platform assembly, and the test application DUT 602.

As noted above, one of the drawbacks of prior systems is that software was loaded onto a mobile terminal 16 during production of the mobile terminal for use in production testing of hardware of the mobile terminal in the factory. After completion of the testing of the hardware in the factory, the software loaded onto the mobile terminal for the production testing was removed and software for use during the lifecycle of the mobile terminal was loaded onto the mobile terminal. In accordance with the principles of the present invention, because the mobile-terminal platform assembly 12 permits access by the test application DUT 602 to both the software stacks 30, 32, 34, 36, and 38, as well as the hardware blocks 40, 42, 44, 46, and 48 via the middleware services layer 28, the software used during the lifecycle of the mobile terminal 16 and during testing of the mobile terminal 16 are at least very similar, if not identical, to one another. Therefore, both the software and the hardware of the mobile terminal 16 can now be tested during production testing without downloading of software twice.

Figure 7:
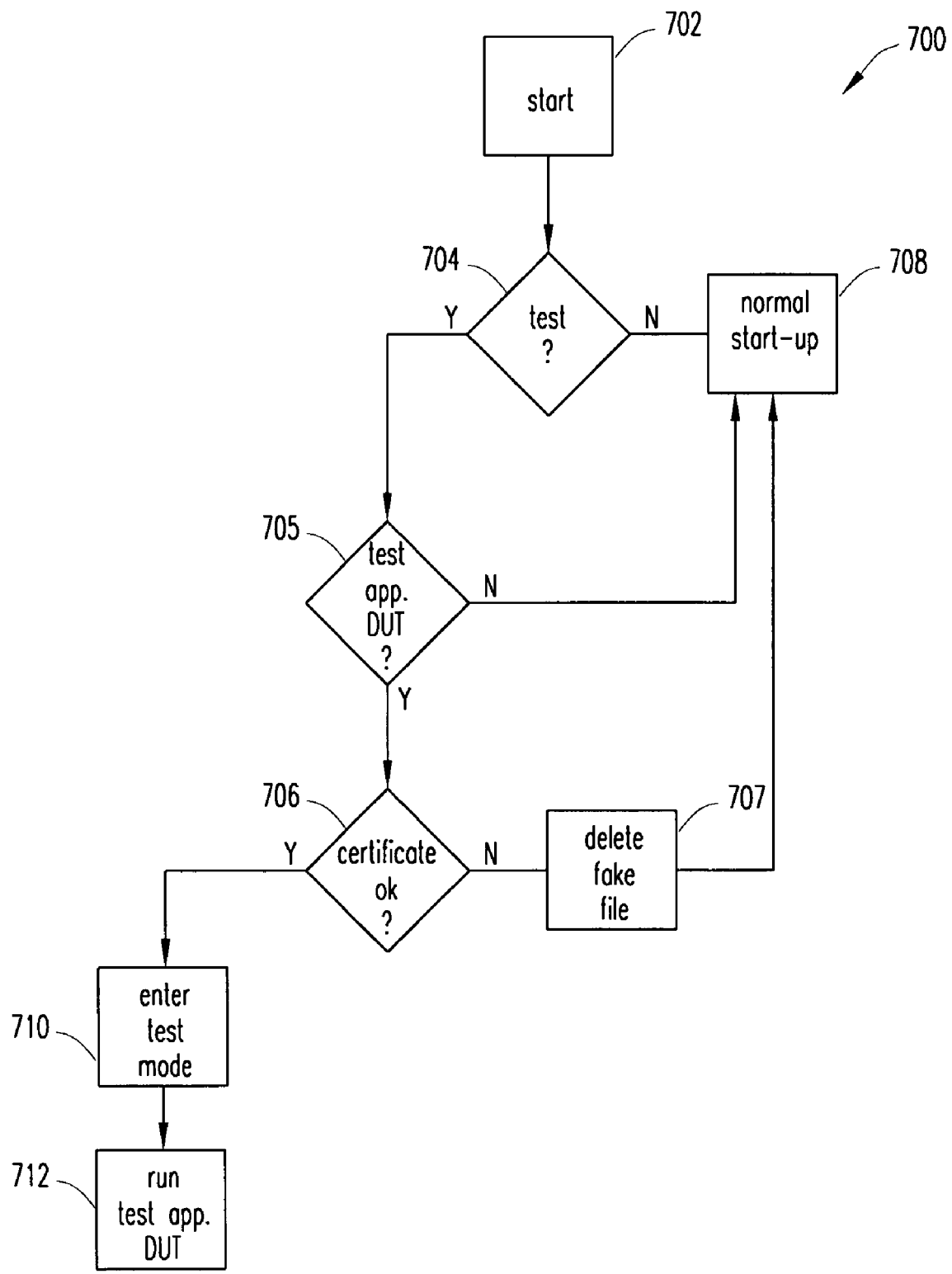
FIG. 7 is a flow diagram that illustrates a test-application start-up process of a mobile terminal in accordance with principles of the present invention.

FIG. 7 is a flow diagram that illustrates a test-application start-up process of the mobile terminal 16 in accordance with principles of the present invention. The test-application start-up process is generally shown by a flow 700. In embodiments of the present invention, the mobile terminal 16 supports at least two operation modes: normal mode and test mode. The mobile terminal 16 determines at start up in which mode the mobile terminal 16 must boot. When the mobile terminal 16 is operated in the test mode, software that might interfere with the test application DUT 602 is not active, so that unpredictable interaction between software modules can be avoided.

Returning to FIG. 7, the flow 700 begins at step 702. At step 702, the mobile terminal 16 is started. At step 704, a determination is made whether a test (i.e., a factory test or service test) is to be performed. In embodiments of the present invention, different test configurations are supported for production testing and product development testing, such that different sets of test commands are supported in each configuration. It is preferably impossible to force the platform system 10 into the test mode without the test application DUT 602 installed on the mobile terminal 16 in order to avoid unpredictable behavior.

At step 704, if it is determined that a test is not to be run, execution proceeds to step 708, at which step normal start-up is performed. If it is determined at step 704 that a test is to be performed, execution proceeds to step 705. At step 705, it is determined whether the test application DUT 602 is present on the mobile terminal 16. If the test application DUT 602 is not found on the mobile terminal at step 705, execution proceeds to step 708, at which step normal start-up occurs. If it is determined at step 705 that the test application DUT 602 is present, execution proceeds to step 706. At step 706, a check is made to determine whether a certificate of the test application DUT 602 set during production of the mobile terminal 16 is valid. The certificate of the test application DUT 602 is a security mechanism that is used to protect against unauthorized test-mode access, and may be, for example, a digital signature.

From step 706, if it is determined that the certificate is valid, execution proceeds to step 710, at which step the test mode is entered. At step 712, the test application DUT 602 is run. If, at step 706, it is determined that the certificate is not valid, execution proceeds to step 707, at which step any fake test application DUT present on the mobile terminal 16 is deleted from the mobile terminal 16. From step 707, execution proceeds to step 708.

While exemplary embodiments of the present invention have been described, it should be recognized that the invention can be varied in many ways without departing therefrom. For example, although the present invention has been described primarily as being used in a mobile terminal, the invention may also be used in other systems. Because the invention can be varied in numerous ways, it should be understood that the invention should be limited only insofar as is required by the scope of the following claims.

What is claimed is:

1. A platform system comprising:
   a software services component comprising at least one functional software unit;
   a hardware component comprising at least one hardware unit associated with the at least one functional software unit; and
   a software interface component comprising at least one software interface and a mobile-terminal application software for testing the mobile terminal, the software interface component being adapted to provide access by the mobile-terminal application software to the software services component and the hardware component during testing of a mobile terminal and during a lifecycle of the mobile terminal;
   the software interface component being adapted to isolate the hardware component and software services component from user applications;
   the mobile-terminal application software being adapted to detect failures in the hardware component; and
   wherein a code space occupied by the mobile-terminal application software is overwritten by user applications after the testing of the mobile terminal has been completed.

2. The platform system of claim 1, wherein the mobile-terminal application software comprises software for testing the mobile terminal during production of the mobile terminal.

3. The platform system of claim 2, wherein the mobile-terminal application software comprises software for use during servicing of the mobile-terminal during the lifecycle of the mobile terminal.

4. The platform system of claim 3, further comprising the mobile-terminal application software.

5. The platform system of claim 1, wherein the mobile-terminal application software comprises software for testing the mobile terminal during servicing of the mobile terminal during the lifecycle of the mobile terminal.

6. The platform system of claim 1, wherein the software interface component comprises a middleware services layer.

7. The platform system of claim 1, further comprising the mobile-terminal application software, wherein the mobile-terminal application software comprises software for testing the mobile terminal during servicing of the mobile terminal during the lifecycle of the mobile terminal.

8. The platform system of claim 1, wherein the hardware component interfaces with a factory test system, the factory test system being adapted to control the software for testing the mobile terminal during production of the mobile terminal.

9. The platform system of claim 1, wherein the hardware component interfaces with a factory test system, the factory test system being adapted to control the software for testing the mobile terminal during servicing of the mobile terminal during the lifecycle of the mobile terminal.

10. The platform system of claim 1, wherein the mobile terminal is for use in a wireless telecommunication system.

11. A method of testing a mobile terminal the method comprising:
- providing in the mobile terminal a software interface component having at least one software interface, the software interface component adapted to isolate software service components and hardware components of the mobile terminal from user application software;
- interoperably connecting the mobile terminal to a test system;
- providing, via the interface component, of access by a mobile-terminal-test application software to the software and hardware of the mobile terminal during testing of the mobile terminal;
- controlling, by the test system, the mobile-terminal-test application software via an external interface during the testing of the mobile terminal;
- detecting, by the test system, failures in hardware of the mobile terminal;
- retaining the software interface component, the hardware, and the software on the mobile terminal; and
- overwriting the mobile-terminal-test-application software from the mobile terminal with a user application.

12. The method of claim 11, further comprising the step of using the mobile terminal in a wireless telecommunication system.

13. The method of claim 11, further comprising the step of overwriting the mobile-terminal-test-application software with a user application after it has been provided to a customer.

14. The method of claim 11, wherein the mobile-terminal application software comprises software for testing the mobile terminal during production of the mobile terminal.

15. The method of claim 11, wherein the mobile-terminal application software comprises software for testing the mobile terminal during servicing of the mobile terminal during the lifecycle of the mobile terminal.

* * * * *